United States Patent
Chaudhary et al.

(10) Patent No.: US 9,672,485 B2
(45) Date of Patent: Jun. 6, 2017

(54) SUPPLY CHAIN NETWORK STRATEGIC DESIGN SYSTEM

(71) Applicant: Oracle International Corporation, Redwood Shores, CA (US)

(72) Inventors: Satej Chaudhary, Fremont, CA (US); Vinay Deshmukh, Hyderabad (IN); Madhav Hari Ghalsasi, Hyderabad (IN); Krishnamoorthy Sriram Vishnampetai, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 795 days.

(21) Appl. No.: 14/089,890

(22) Filed: Nov. 26, 2013

(65) Prior Publication Data

US 2015/0149233 A1 May 28, 2015

(51) Int. Cl.
G06Q 10/00 (2012.01)
G06Q 10/06 (2012.01)
G06Q 10/08 (2012.01)

(52) U.S. Cl.
CPC ....... G06Q 10/06315 (2013.01); G06Q 10/08 (2013.01)

(58) Field of Classification Search
CPC .................... G06Q 10/00–50/00; G06Q 90/00
USPC ................................................ 705/7.11–7.42
See application file for complete search history.

(56) References Cited

U.S. PATENT DOCUMENTS

| | | | |
|---|---|---|---|
| 7,877,287 B1 * | 1/2011 | Bailey | G06Q 10/06375 705/7.31 |
| 7,917,458 B2 * | 3/2011 | Dalton | G06K 9/00785 706/46 |
| 7,957,996 B2 * | 6/2011 | Goldberg | G06Q 10/0631 705/7.12 |
| 8,010,399 B1 * | 8/2011 | Bruce | G06Q 30/02 705/7.29 |
| 8,027,868 B1 * | 9/2011 | House | G06Q 30/0205 705/7.34 |
| 8,239,245 B2 * | 8/2012 | Bai | G06Q 10/04 705/7.11 |
| 8,265,984 B2 * | 9/2012 | Bai | G06Q 10/04 705/7.23 |

(Continued)

OTHER PUBLICATIONS

Gastner, Michael T., and M. E. J. Newman. "Optimal design of spatial distribution networks." Physical Review E 74.1 (2006): 016117.*

(Continued)

Primary Examiner — Alan S Miller
(74) Attorney, Agent, or Firm — Miles & Stockbridge P.C.

(57) ABSTRACT

A system is provided that designs a supply chain network. The system identifies a service level agreement metric definition. The system further generates a grid including cells, where the grid is located over a representation of a geographical region. The system further computes a service level agreement metric for each cell of the grid using the service level agreement metric definition. The system further selects cells that have the largest service level agreement metrics and that have not been previously selected. The system further positions a supply chain network resource at a center of the selected cells. The system further computes a service level agreement based on the service level agreement metric of the selected cells.

21 Claims, 11 Drawing Sheets

(56) References Cited

U.S. PATENT DOCUMENTS

| | | | |
|---|---|---|---|
| 8,392,240 B2* | 3/2013 | Vaidhyanathan | G06Q 90/00 705/7.12 |
| 8,639,549 B2* | 1/2014 | Pathak | G06Q 10/00 705/7.12 |
| 2003/0033195 A1* | 2/2003 | Bruce | G06Q 30/02 705/7.31 |
| 2008/0097731 A1* | 4/2008 | Lanes | G06Q 10/087 703/2 |
| 2009/0228313 A1* | 9/2009 | Ding | G06Q 10/08 703/6 |
| 2011/0125543 A1 | 5/2011 | Saito et al. | |
| 2012/0265581 A1 | 10/2012 | Notani et al. | |
| 2012/0317059 A1 | 12/2012 | Joshi et al. | |
| 2013/0138470 A1 | 5/2013 | Goyal et al. | |

OTHER PUBLICATIONS

Church, Richard L. "Geographical information systems and location science." Computers & Operations Research 29.6 (2002): 541-562.*

Zeng, Thomas Q., and Qiming Zhou. "Optimal spatial decision making using GIS: a prototype of a real estate geographical information system (REGIS)." International Journal of Geographical Information Science 15.4 (2001): 307-321.*

Oracle Value Chain Planning, Strategic Network Optimization, http://www.oracle.com/us/products/applications/056991.pdf (last visited Oct. 8, 2013), Copyright 2012.

Wikipedia, "Greenfield project", http://en.wikipedia.org/wiki/Greenfield_project (last visited Oct. 8, 2013).

IBM, "Supply Chain Optimization", http://www-03.ibm.com/software/products/us/en/supply-chain-optimization (last visited Oct. 8, 2013).

Wikipedia, "Tabu search", http://en.wikipedia.org/wiki/Tabu_search (last visited Oct. 8, 2013).

Nilgun Fescioglu-Unver, "Application of Self Controlling Software Approach to Reactive Tabu Search", http://www.ece.neu.edu/faculty/kokar/publications/SCTabu_SASO08.pdf (last visited Oct. 8, 2013).

Llamasoft, "Winning Through Better Supply Chain Design", http://www.llamasoft.com/wp-content/uploads/2012/12/WP-Winning-Through-Better-SCD-US-2. pdf (last visited Oct. 9, 2013), Copyright 2012.

IBM, "IBM ILOG LogicNet Plus XE", http://www-03.ibm.com/software/products/us/en/ibmiloglogiplusxe/ (last visited Oct. 9, 2013).

Prof. Olivier L. de Weck et al., "Isoperformance: Analysis and Design of Complex Systems with Known or Desired Outcomes", 14th Annual International Symposium of the International Council on Systems Engineering (INCOSE), 2004, http://esd.mit.edu/Headline/incose_3_best_papers/isoperformance.pdf (last visited Oct. 9, 2013).

* cited by examiner

SUPPLY CHAIN NETWORK STRATEGIC DESIGN SYSTEM

FIELD

One embodiment is directed to a computer system, and more particularly, to a computer system that manages supply chain networks.

BACKGROUND

A "supply chain network" describes a flow and movement of materials and/or information through a supply chain, where a supply chain includes one or more entities associated with producing, handling, and/or distributing a specific product. The supply chain network describes movement of raw primary goods as well as complete products that are delivered to an end-customer. The supply chain network also describes demand from the end-customer that is sent to one or more entities within the supply chain.

Supply chain efficiencies, responsiveness, and resilience are largely dependent on a quality of a design of a supply chain network. The supply chain network periodically needs to be evaluated to account for changes to the supply chain, such as changes in shipment volumes, changes to the customer base, introduction of new systems, and obsolescence of existing systems. Designing a supply chain network is a strategic activity with a potential to provide quantum benefits in terms of costs and service levels to customers. Likewise, poor supply chain network design can result in service problems. For example, if a supply chain network includes too many entities close to each other (e.g., a company opens up too many stores or offices close to each other), this can lead to under-utilization of resources and increased costs. Further, if the supply chain network includes too few entities (e.g., the company opens up too few stores or offices), this can lead to poor coverage of the target market.

SUMMARY

One embodiment is directed to a system that designs a supply chain network. The system identifies a service level agreement metric definition. The system further generates a grid including cells, where the grid is located over a representation of a geographical region. The system further computes a service level agreement metric for each cell of the grid using the service level agreement metric definition. The system further selects a cell that includes a largest service level agreement metric and that has not been previously selected. The system further positions a supply chain network resource at a center of the selected cell. The system further computes a service level agreement based on the service level agreement metric of the selected cell. The system further determines whether the service level agreement is greater than or equal to a service level agreement threshold. The system further repeats the selecting, placing, computing, and determining until the service level agreement is greater than or equal to the service level agreement threshold.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
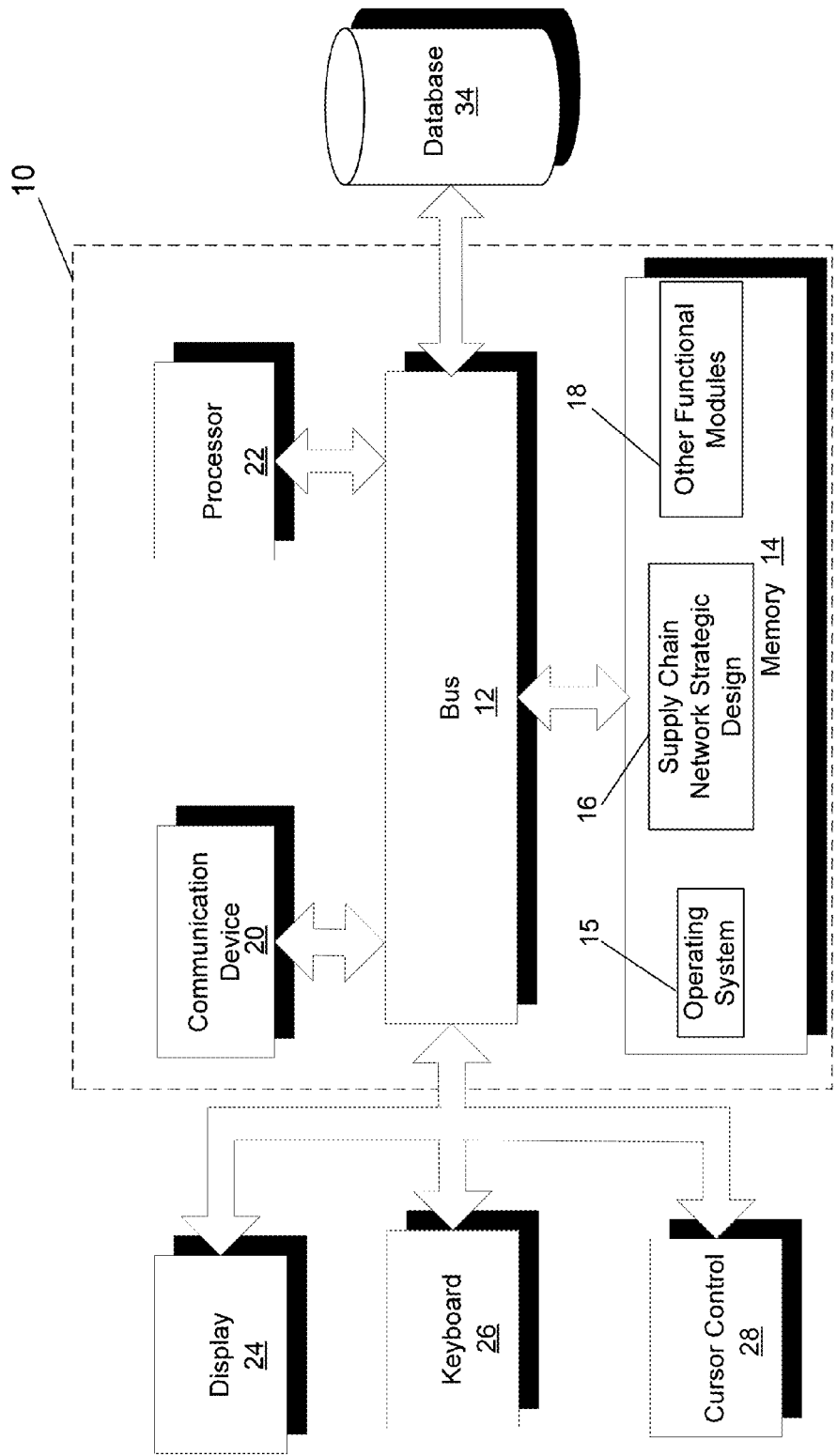
FIG. 1 illustrates a block diagram of a system that can implement an embodiment of the invention.

According to an embodiment, a system is provided that can design a supply chain network from scratch by identifying optimal positions (i.e., locations) for supply chain network resources based on a defined service level agreement metric, where a supply chain network resource is a resource that produces goods, services, products, or other types of items for a supply chain entity within the supply chain network. The system can utilize a strategic supply chain network design algorithm to plot a grid on a selected region, and to identify the centers of all cells of the grid. The system can further utilize the algorithm to identify the optimal positions for supply chain network resources based on calculated service level agreement metrics for each cell of the grid. The system can further display a representation of the selected region and the identified optimal positions for the supply chain network resources within a user interface of the system. By positioning the supply chain network resources in optimal positions that satisfy service level agreement metrics, the system can design the supply chain network in a strategic manner. In certain situations, the system may identify an optimal position for a supply chain network resource that is not a feasible position. For example, an identified optimal position for a supply chain network resource may be located within a body of water, such as a lake, or may be located within a residential area. It may not be feasible to locate the supply chain network resource in the identified optimal position. In these situations, the system can identify an alternate position for the supply chain network resource, where the alternate position is the closest feasible position to the identified optimal position.

As previously described, a high-quality supply chain network can require that supply chain network resources be located in optimal positions within the supply chain network. Optimal positions of supply chain network resources can allow a supply chain provider to provide maximum service to customers while keeping costs at a minimum. Further, it can be ideal to continually evaluate an existing supply chain network from time to time (e.g., every six months or every year) to determine that the existing supply chain network meets the needs of the customer base. Existing positions of supply chain network resources may no longer be optimal due to changes to a customer base, such as: new customers; departing customers; merging customers; relocated customers; or change in demand of existing customers due to rollout of new products.

Existing supply chain network design techniques can fall under one of two categories: iterative network design techniques; and "Greenfield" network design techniques. Iterative network design techniques generally take an existing network as an input, and iteratively determine optimal placement of network resources by either retaining a network resource in its existing position or by removing the network resource from the network. However, iterative network design techniques do not generally suggest new positions for network resources. In contrast, "Greenfield" network design techniques generally start "from scratch" (i.e., with an empty network), analyze a customer base, and determine optimal placement of network resources by generating positions for the network resources within the network. "Greenfield" network design techniques can further compare the generated network design with an existing network design, identify differences in network resource positions, and determine, for each network resource, whether to keep a network resource in its existing position, relocate the network resource to the newly generated position, or remove the network resource from the network.

Within the category of Greenfield network design techniques, there can be two sub-categories: linear programming (i.e., optimization) techniques; and "satisficing" techniques. Optimization techniques utilize a mathematical model and seek a network design solution that minimizes or maximizes an objective function. However, optimization techniques typically suffer from the following problems. First, optimization techniques generally require high quality input data to generate an optimal solution. Second, optimization techniques generally require significant effort to generate and implement an optimal solution. If the generated optimal solution does not produce a business benefit proportional to the expended effort, this can result in an inefficient allocation of resources. Third, there is typically no guarantee of solution stability, as today's optimal solution will not necessarily be optimal tomorrow due to changes in the customer base. Fourth, optimization techniques typically take a significant amount of time to generate an optimal solution. Fifth, optimization techniques generally require that all possible positions of a network resource be input before they can generate an optimal solution.

In contrast to optimization techniques, "satisficing" techniques accept a solution that satisfies an objective function, even if the solution is not an optimal solution. The concept of satisficing was first proposed by Herbert Simon, and later operationalized into a method called "isoperformance" by Oliver De Weck and Marshall Jones. One category of satisficing techniques includes local search heuristics techniques. Local search heuristic techniques can move from solution to solution within a space of candidate solutions (i.e., a "search space") by applying local changes, until either a solution deemed optimal is located, or a time bound has elapsed. However, typical local search heuristic techniques can also require significant development effort, and can take a significant amount of time to generate a solution. Another category of satisficing techniques includes data mining (i.e., "clustering") techniques, such as K-means, which can group a set of network resources such that network resources in the same group (or "cluster") are more similar to each other than to those in other groups (or clusters). However, clustering techniques typically suffer from the problem that it is difficult to avoid overlapping clusters. Therefore, it is difficult to maintain a minimum distance between the centroids of those clusters. This can result in network resources that are located to close to each other. Further, both local search heuristics techniques and clustering techniques also typically require that all possible positions of a network resource be input before they can generate an optimal solution.

Thus, according to an embodiment of the invention, a strategic supply chain network design algorithm can be implemented to design a supply chain network. The algorithm can utilize a Greenfield network design technique and design a supply chain network from an empty supply chain network. The algorithm can further utilize a satisficing technique to design the supply chain network. However, unlike previous Greenfield network design techniques and satisficing techniques, the algorithm can take into consideration a service level agreement metric definition in designing the supply chain network, where a service level agreement metric is a metric that defines a level of service provided by the supply chain network. A service level agreement metric is further described below in greater detail. By utilizing a service level agreement metric, the problems of previous supply chain network design techniques can be avoided.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a supply chain network strategic design module 16, as well as other functional modules 18. Operating system 15 can provide an operating system functionality for system 10. Supply chain network strategic design module 16 can provide functionality for strategically designing a supply chain network so that the supply chain network includes an optimal configuration of supply chain network resources. In certain embodiments, supply chain network strategic design module 16 can comprise a plurality of modules, where each module provides specific individual functionality for strategically designing a supply chain network so that the supply chain network includes an optimal configuration of supply chain network resources. System 10 can also be part of a larger system. Thus, system 10 can include one or more additional functional modules 18 to include the additional functionality. For example, functional modules 18 may include modules that provide additional functionality, such as supply chain network design functionality.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
FIG. 2 illustrates an example map of a geographical region, according to an embodiment of the invention.

FIG. 2 illustrates an example map 200 of a geographical region, according to an embodiment of the invention. More specifically, map 200 is a map of a geographical region of interest. The geographical region of interest can be any geographic region. For example, the geographical region can be a country, or a set of contiguous countries. As another example, the geographical region can be a specific region within a country. Map 200 includes customer indicators 210, where each customer indicator of customer indicators 210 represents one or more customers within the geographical region of interest.

According to an embodiment, a strategic supply chain network design algorithm can display map 200 (including customer indicators 210) within a user interface. Further, the algorithm can be implemented based on map 200, where an objective of the algorithm is to identify optimal positions of supply chain network resources that satisfy a desired service level agreement. A service level agreement can be defined according to one of many definitions, but the underlying concept of the service level agreement is an ability to ensure that a customer receives a good, service, product, or other type of item that can be produced by a supply chain network resource. Germane to the concept of the service level agreement is the notion of a "ship method." A ship method indicates a mode of delivery of a good, service, product, or other type of item by a supply chain network resource to a customer. As an example, a ship method can indicate that the good, service, product, or other type of item is delivered to the customer within a same day of a customer order, or possibly within the next day. A supply chain network can be designed with a maximum theoretical service level agreement as a parameter.

According to an embodiment, a supply chain network resource can be a warehouse, where the warehouse produces a product that can be delivered to one or more customers. However, this is only an example embodiment, and in other embodiments, a supply chain network resource can be any resource that produces goods, services, products, or other types of items for a supply chain entity within the supply chain network. Other examples of supply chain network resources, according to other alternate embodiments, can include: coffee shops, grocery stores, restaurants, pharmacy stores, hospitals, automated teller machines ("ATMs"), gas stations, postal offices, or logistics offices. While the illustrated embodiment of FIG. 2 (and other illustrated embodiments) will be described in terms of warehouses, one of ordinary skill in the art will readily appreciate that the description can also apply to other types of supply chain network resources, such as the aforementioned examples.

An example service level agreement definition according to an embodiment is now discussed in greater detail. According to the example service level agreement definition, customers located within a 50-mile radius of a warehouse can be served with a same-day ship method. Customers outside the 50-mile radius can have a same-day or a next-day ship method. The customers that are outside the 50-mile radius but requested same-day shipment are considered to have missed the service level agreement. Based on this example service level agreement definition, a service level agreement can be equal to a number of same-day shipments within a 50-mile radius of all warehouses divided by a total number of same-day shipments. The service level agreement can be represented as a percentage by multiplying the service level agreement by 100. In alternate embodiments, a 50-mile radius can be replaced with an an x-mile radius (where x can be any number).

According to alternate embodiments, alternate examples of service level agreement definitions include: (a) a service level agreement equal to a number of customers within an x-mile radius of all warehouses (where x can be any number) divided by a total number of customers; (b) a service level agreement equal to a total number of shipments within an x-mile radius of all warehouses (where x can be any number) divided by a total number of shipments; or (c) a service level agreement equal to a total revenue of shipments within an x-mile radius of all warehouses (where x can be any number) divided by a total revenue of shipments. Further, any of the aforementioned service level agreements can be represented as percentages by multiplying the aforementioned service level agreements by 100.

The aforementioned example service level agreement metrics are based on supply chain network resources being warehouses. However, in embodiments where supply chain network resources are something other than warehouses, different service level agreement metrics can be used. Below are example service level agreement metrics for other examples of supply chain network resources:

| Supply Chain Network Resources | Example SLA Metrics |
| --- | --- |
| Coffee shops | Population of a certain age and income category |
| Grocery stores | Population in a certain income category based on the brand of the store |

-continued

| Supply Chain Network Resources | Example SLA Metrics |
|---|---|
| Restaurants | Population of a certain demographic based on the type of restaurant |
| Pharmacy stores | Population in a certain high-health risk category |
| Hospitals | Population in a certain high-health risk category |
| ATMs | Population |
| Gas stations | Population of cars |
| Postal or Logistics offices | Volume of mail |

According to the illustrated embodiment of FIG. 2 (and other illustrated embodiments), the following service level agreement definition can be defined: a service level agreement equal to a number of customers within an x-mile radius of all warehouses (where x can be any number) divided by a total number of customers (and further multiplied by 100 to represent the service level agreement as a percentage). Also according to the embodiment, a strategic supply chain network design algorithm can be implemented to find optimal positions of warehouses within map 200 that yield a service level agreement of a pre-defined service level agreement threshold amount, such as 70%. In alternate embodiments, the algorithm can be implemented for any other choice of service level agreement definition in a very similar fashion.

According to an embodiment, the strategic supply chain network design algorithm can first identify a service level agreement metric, where the service level agreement metric depends on a service level agreement definition that the algorithm is to use. For example, if a service level agreement is defined to be equal to a number of customers within an x-mile radius of all warehouses (where x can be any number) divided by a total number of customers, then a service level agreement metric is identified as a number of customers. Alternatively, if a service level agreement is defined to be equal to a total number of shipments within an x-mile radius of all warehouses (where x can be any number) divided by a total number of shipments, then a service level agreement metric is identified as a number of shipments. Further, if a service level agreement is defined to be equal to a total revenue of shipments within an x-mile radius of all warehouses (where x can be any number) divided by a total revenue of shipments, then a service level agreement metric is identified as a revenue of shipments. Alternatively, if a service level agreement is defined to be equal to a number of same-day shipments within a 50-mile radius of all warehouses divided by a total number of same-day shipments, then a service level agreement metric is identified as a number of same-day shipments. According to the illustrated embodiment of FIG. 2, the service level agreement is identified as a number of customers based on the service level agreement definition.

Figure 3:
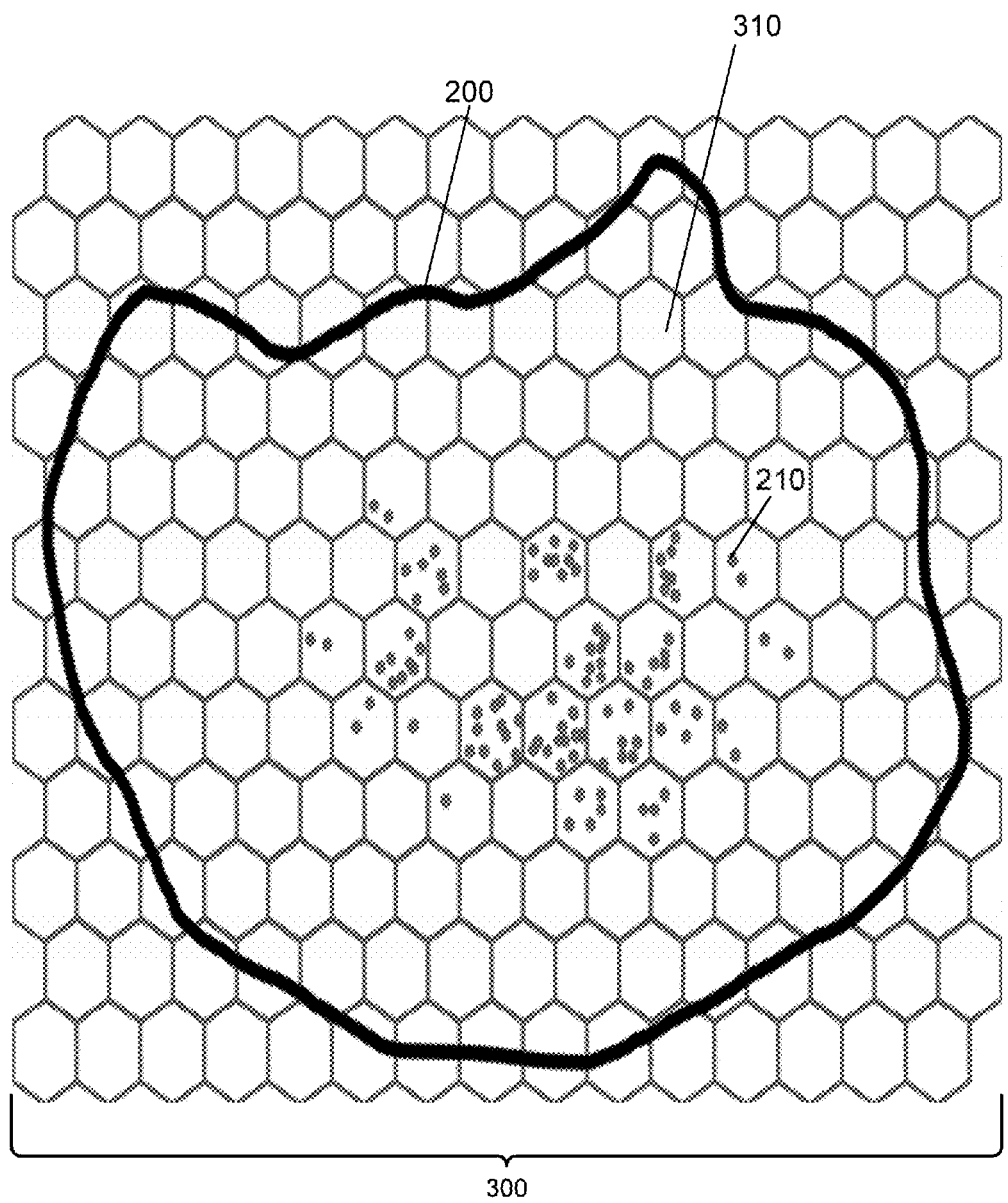
FIG. 3 illustrates a grid of cells over the geographical region, according to an embodiment of the invention.

FIG. 3 illustrates a grid 300 of cells 310 over the geographical region, according to an embodiment of the invention. According to the illustrated embodiment, after a strategic supply chain network design algorithm identifies a service level agreement metric, the algorithm generates a regular grid of cells (e.g., grid 300 of cells 310) over the geographical region of interest. The algorithm can further display grid 300 (including cells 310) within a user interface, where grid 300 can be overlaid on top of map 200. Cells 310 can be of any regular shape (e.g., hexagon, square, triangle, etc.). Further, the size of cells 310 can be defined in accordance with the service level agreement definition. In the illustrated embodiment of FIG. 3, each cell of cells 310 is a hexagon shape, and a size of each cell of cells 310 is such that a distance from a center of the cell to any of the vertices of the cell is x miles, where x can be any number. Hexagonal cells have the advantage that they are a closest regular shape to a circle that can be arranged without overlap. Further, hexagonal cells are especially suitable in cases where the service level agreement definition includes a "within an x-mile radius clause." However, in alternate embodiments, cells 310 can be of any regular shape.

Figure 4:
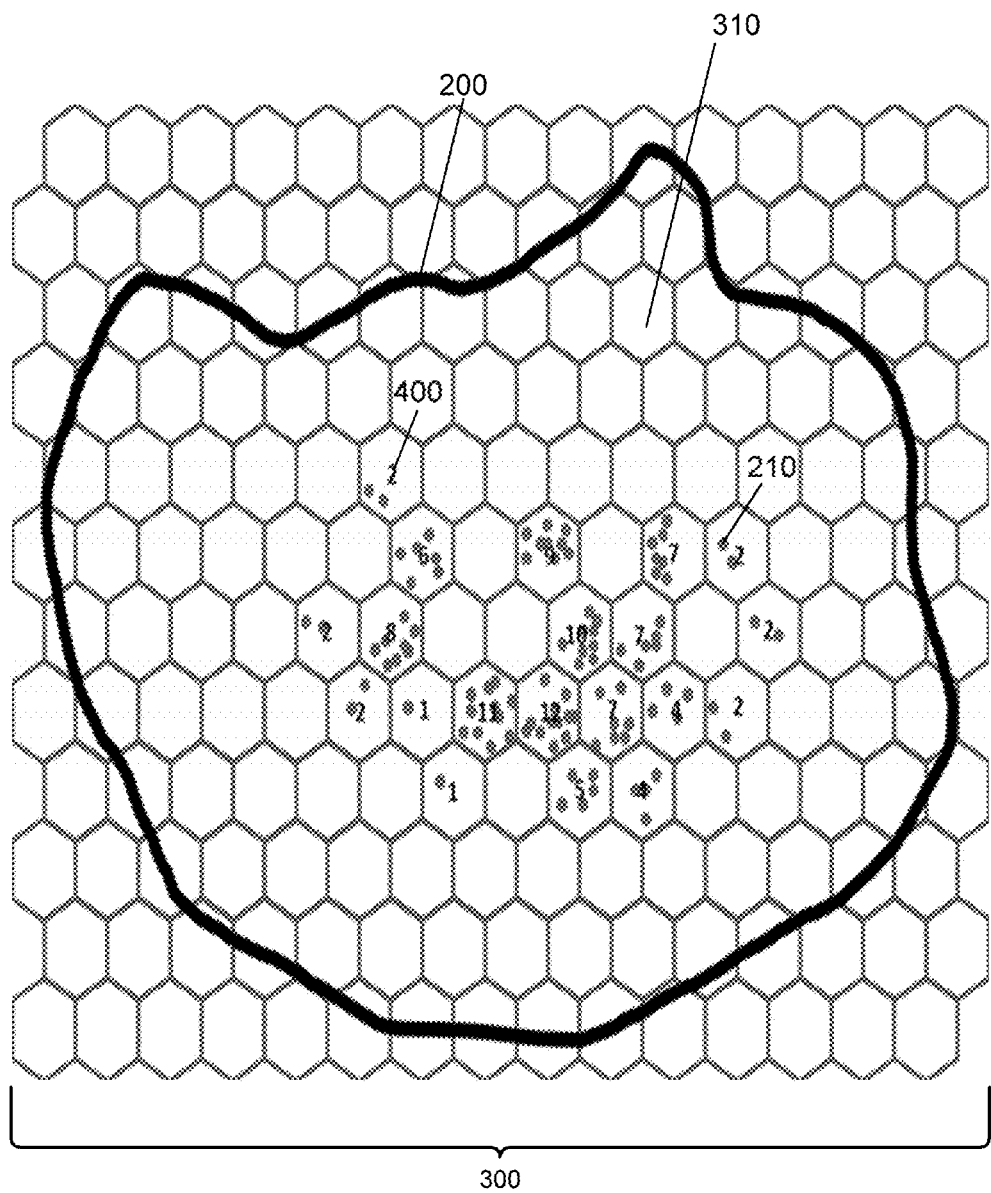
FIG. 4 illustrates service level agreement metric indicators in cells of the grid, where each service level agreement metric indicator represents a service level agreement metric for the corresponding cell, according to an embodiment of the invention.

FIG. 4 illustrates service level agreement metric indicators 400 in cells 310 of grid 300, where each service level agreement metric indicator of service level agreement metric indicators 400 represents a service level agreement metric for a corresponding cell of cells 310, according to an embodiment of the invention. According to the illustrated embodiment, after a strategic supply chain network design algorithm generates grid 300 and cells 310, the algorithm computes a service level agreement metric for each cell of cells 310 that includes one or more customer indicators of customer indicators 210. In the illustrated embodiment of FIG. 4, a service level agreement metric for each cell of cells 310 is equal to a number of customers within each cell 310. Further, each service level agreement metric for each cell of cells 310 is denoted by a service level agreement metric indicator of service level agreement metric indicators 400, where each service level agreement metric indicator of service level agreement metric indicators 400 can be displayed within each cell of cells 310. Thus, according to the embodiment, the algorithm can display service level agreement metric indicators 400 within a user interface, where service level agreement metric indicators 400 can be overlaid on top of grid 300. In the illustrated embodiment of FIG. 4, service level agreement metric indicators 400 are numbers. However, this is only an example embodiment, and, in alternate embodiments, service level agreement metric indicators can be any type of indicator, such as letters, colors, symbols, etc.

Figure 5:
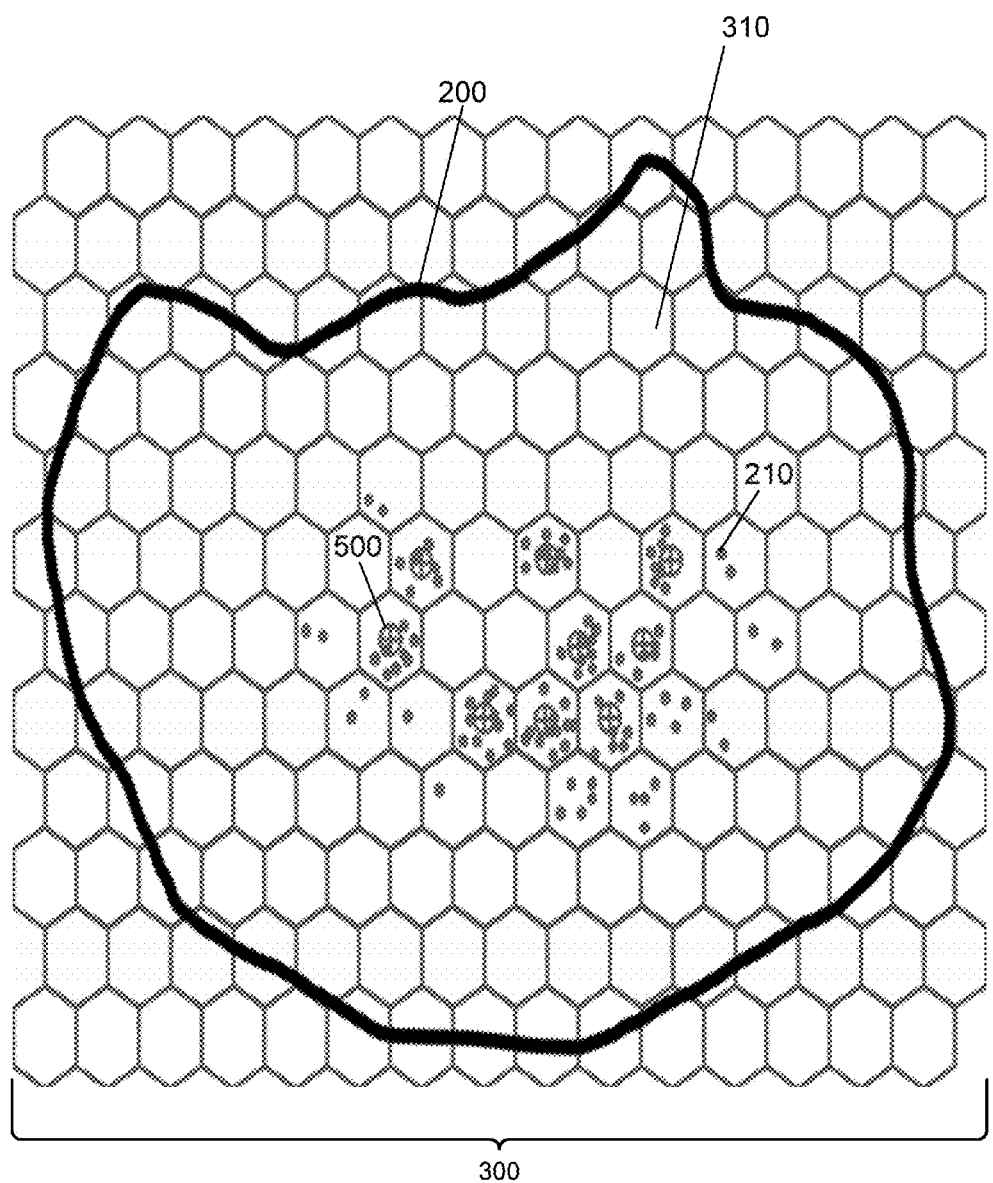
FIG. 5 illustrates supply chain network resources that are positioned at the center of specific cells of the cells in a decreasing order of a service level agreement metric, according to an embodiment of the invention.

FIG. 5 illustrates supply chain network resources 500 that are placed at the center of specific cells of cells 310 in a decreasing order of a service level agreement metric, according to an embodiment of the invention. According to the illustrated embodiment, after a strategic supply chain network design algorithm computes a service level agreement metric for each cell of cells 310, the algorithm positions supply chain network resources 500 within a center of specific cells of cells 310 in a descending order of the service level agreement metric, until a desired service level agreement is achieved. The algorithm can subsequently display supply chain network resources 500 within a user interface, where supply chain network resources 500 can be overlaid on top of grid 300. In the illustrated embodiment, supply chain network resources 500 are represented using red cross-bars. However, in other alternate embodiments, supply chain network resources 500 can be represented using any type of symbols. Further, in the illustrated embodiment, supply chain network resources 500 are warehouses. However, in other alternate embodiments, supply chain network resources 500 can be other types of supply chain network resources.

According to the embodiment, the algorithm first orders cells 310 in a decreasing order of a service level agreement metric, as shown below in the example table:

| Cell Service Level Agreement ("SLA") metric (number of customers in descending order) | Cumulative SLA metric | SLA – Cumulative SLA metric/Total number of customers in the region × 100 | Warehouse number |
|---|---|---|---|
| 12 | 12 | 11.5% | 1 |
| 11 | 23 | 22.1% | 2 |
| 10 | 33 | 31.7% | 3 |
| 9 | 42 | 40.3% | 4 |
| 8 | 50 | 48% | 5 |
| 7 | 57 | 54.8% | 6 |
| 7 | 64 | 61.5% | 7 |
| 7 | 71 | 68.2% | 8 |
| 6 | 77 | 74.0% | 9 |
| 5 | 82 | 78.8% | |
| 4 | 86 | 82.6% | |
| . | | | |
| . | | | |
| . | | | |

According to the embodiment, the algorithm positions supply chain network resources 500 (e.g., warehouses 500) at a center of specific cells of cells 310 in the order listed in the above table. These specific cells of cells 310 can be cells that include one or more customer indicators of customer indicators 210. More specifically, the algorithm first positions a warehouse of warehouses 500 in the center of a cell of cells 310 with a maximum number of customers (i.e., 12 customers). This produces a service level agreement of 11.5%. In accordance with the embodiment, the service level agreement can be computed by first computing a cumulative service level agreement metric that is a sum of the service level agreement metrics of the specific cells, and then dividing the cumulative service level agreement metric by a total service level agreement metric for the geographic region. The service level agreement can then be represented as a percentage by multiplying the service level agreement by 100. The algorithm then positions a warehouse of warehouses 500 in the center of a cell of cells 310 with a second largest number of customers (i.e., 11 customers). This produces a service level agreement of 22.1%. The algorithm then continues to position warehouses 500 in the center of specific cells of cells 310 in a descending order of their number of customers until nine warehouses have been positioned, and a service level agreement of 74% is produced (as shown in the bolded cells of the above table).

Figure 6:
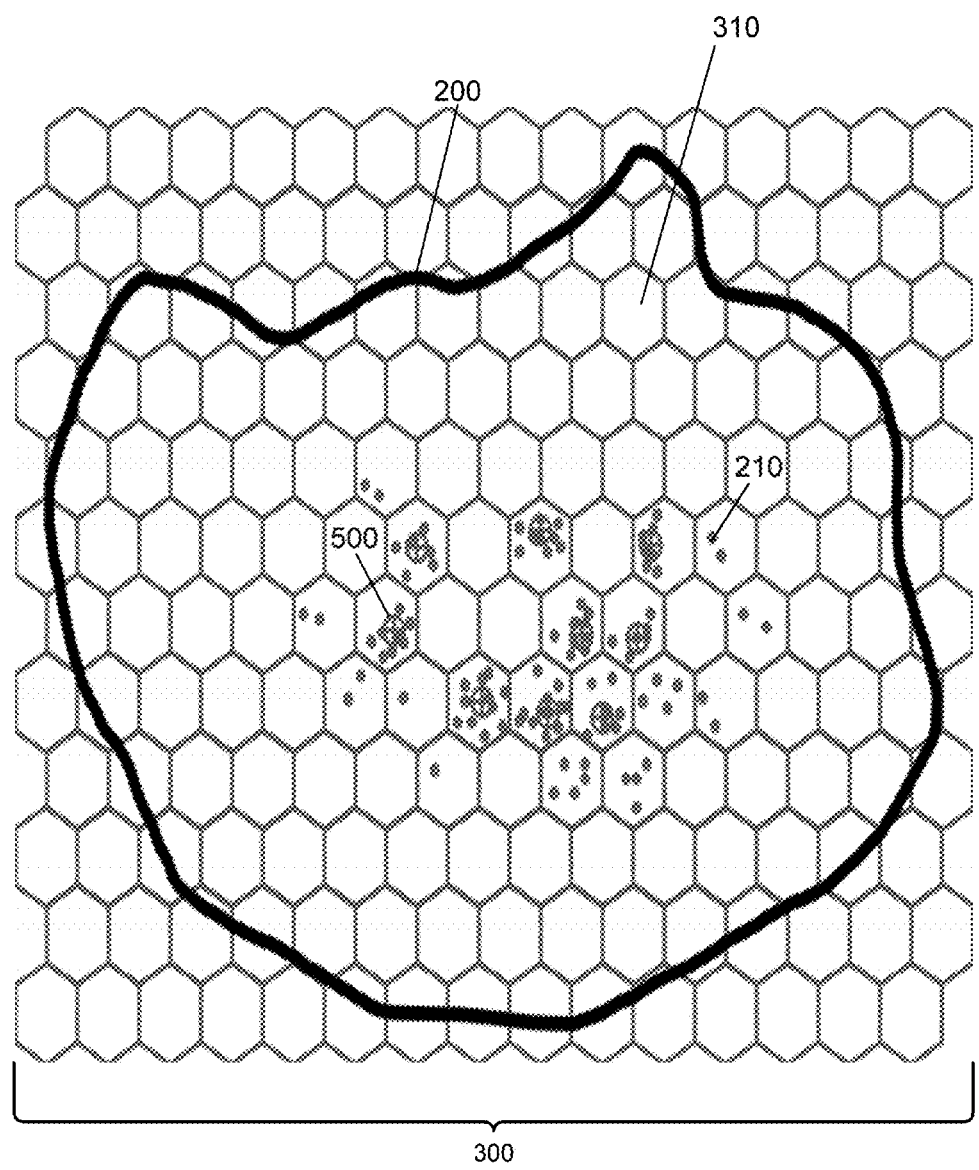
FIG. 6 illustrates supply chain network resources whose positions are each adjusted from a center of a cell of the cells to a center of mass of the service level agreement metric for the cell, according to an embodiment of the invention.

FIG. 6 illustrates supply chain network resources 500 (e.g., warehouses 500) whose positions are each adjusted from a center of a cell of cells 310 to a center of mass of the service level agreement metric for the cell, according to an embodiment of the invention. According to the illustrated embodiment, after a strategic supply chain network design algorithm positions warehouses 500 within a center of certain cells of cells 310 in a descending order of the service level agreement metric, the algorithm adjusts a position of some or all of warehouses 500 from a center of a cell of cells 310 to a center of mass of the service level agreement metric (e.g., a center of the customers) for the cell. This can be done to reduce the costs of a ship method for each cell (i.e., the costs of shipping goods, services, products, or other types of items from each warehouse to the customers within each cell).

Figure 7:
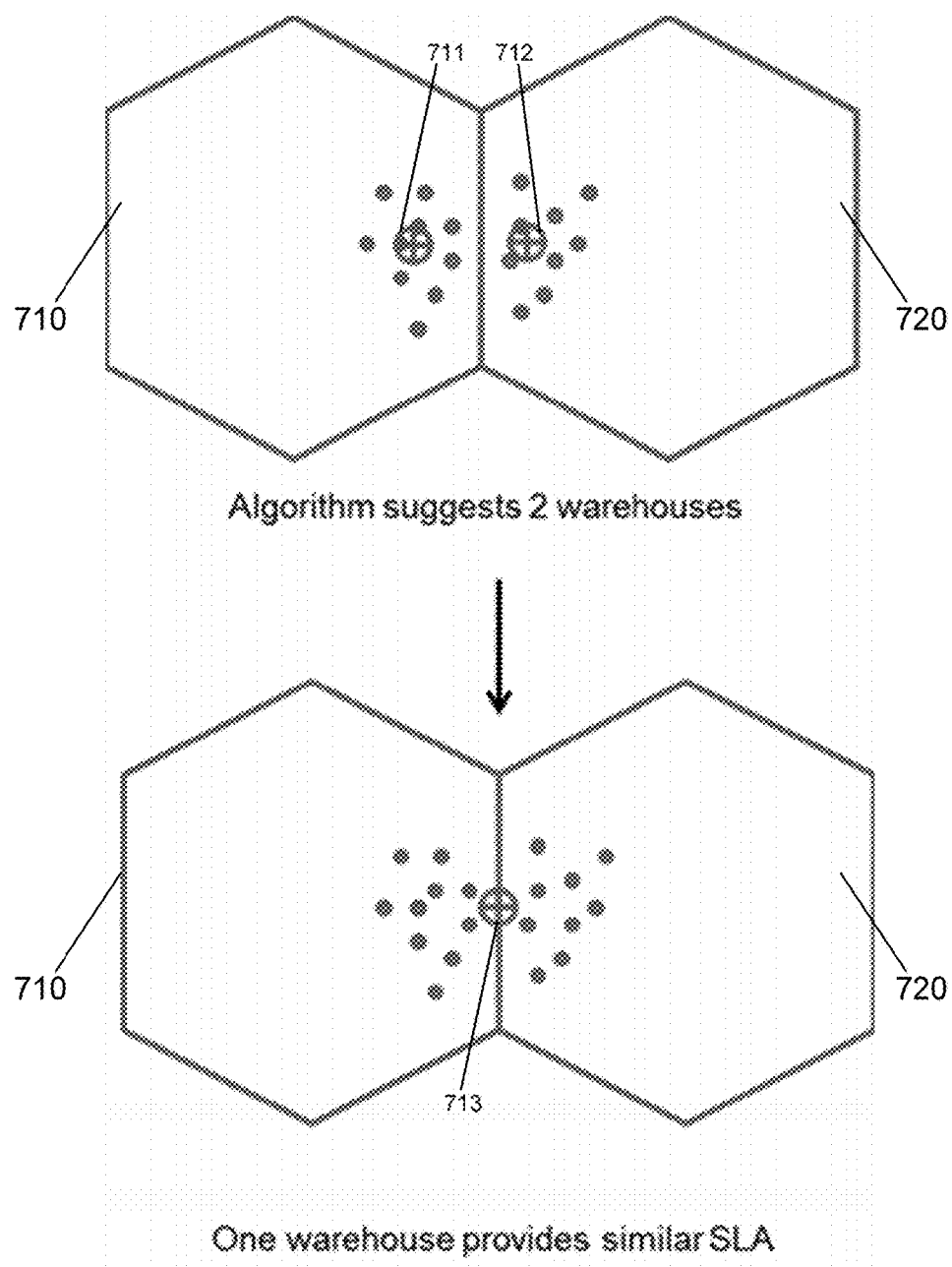
FIG. 7 illustrates a replacement of two supply chain network resources with a single supply chain network resource, according to an embodiment of the invention.

FIG. 7 illustrates a replacement of two supply chain network resources 711 and 712 (e.g., warehouses 711 and 712) with a single supply chain network resource 713 (e.g., warehouse 713), according to an embodiment of the invention. There may be certain instances where cells of a grid are placed such that they cut through a dense cluster of customers. In these instances, even though a strategic supply chain network design algorithm positions two or three warehouses in adjacent cells, it may be possible to position fewer warehouses within the adjacent cells, which maintaining an identical or similar level of a service level agreement.

FIG. 7 illustrates an example of this scenario, where FIG. 7 includes two adjacent cells 710 and 720, where cell 710 includes warehouse 711, and cell 720 includes warehouse 712. According to the illustrated embodiment, the algorithm positions warehouse 711 at a center of the customers within cell 710, and the algorithm further positions warehouse 712 at a center of the customers within cell 720.

To handle these instances, according to certain embodiments, a second pass of the strategic supply chain network design algorithm can be implemented. In the second pass, the algorithm first identifies patterns of adjacent cells where the algorithm has previously positioned warehouses. Identifying patterns of adjacent cells is further described below in greater detail in conjunction with FIG. 8. The algorithm subsequently merges the adjacent cells into a single cell. The algorithm further eliminates one or more warehouses that the algorithm previously positioned from the adjacent cells. The algorithm subsequently positions the warehouses at centroid locations of n clusters computed using a k-means algorithm or some other clustering algorithm, where n can be any number. The algorithm further determines whether a new service level agreement produced by the new configuration of warehouses is identical or similar to the original service level agreement produced by the original configuration of warehouses. In certain embodiments, the algorithm can determine whether the two service level agreements are similar by determining whether a difference between the original service level agreement and the new service level agreement is less than or equal to a pre-defined service level agreement threshold amount. If the new service level agreement is identical or similar to the original service level agreement, then the new configuration of warehouses is retained. Otherwise, the original configuration of warehouses is retained.

FIG. 7 also illustrates an example of the algorithm replacing an original configuration of warehouses with a new configuration of warehouse, where FIG. 7 includes warehouse 713, and where warehouse 713 replaces warehouses 711 and 712. According to the illustrated embodiment, warehouse 713 is positioned at a centroid location of the merged cell that includes cells 710 and 720.

Figure 8:
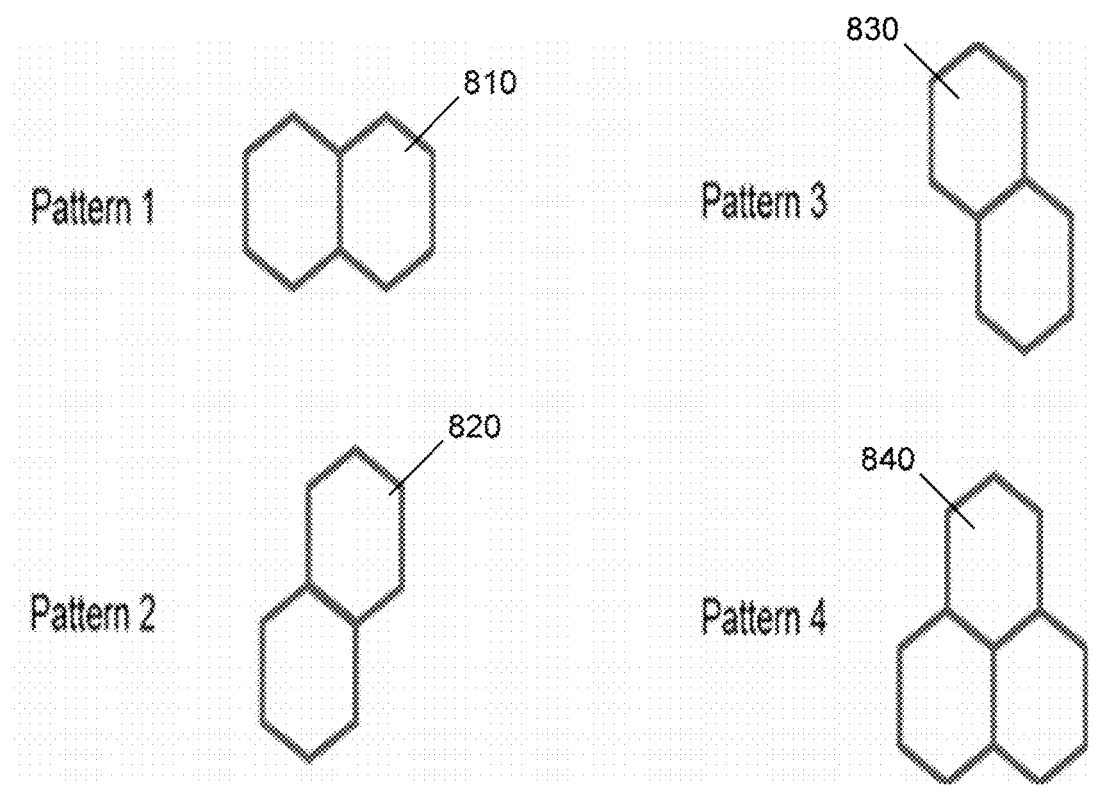
FIG. 8 illustrates patterns of adjacent cells, according to an embodiment of the invention.

FIG. 8 illustrates patterns of adjacent cells, according to an embodiment of the invention. More specifically, FIG. 8 illustrates adjacent cell patterns 810, 820, 830, and 840. As previously described, as part of a second pass, a strategic supply chain network design algorithm can identify patterns of adjacent cells. Adjacent cell patterns 810, 820, and 830 are patterns that include two adjacent hexagonal cells, and adjacent cell pattern 840 is a pattern that includes three adjacent hexagonal cells. However, these are only example adjacent cell patterns, and, in alternate embodiments, other types of adjacent cell patterns can be identified.

Figure 9:
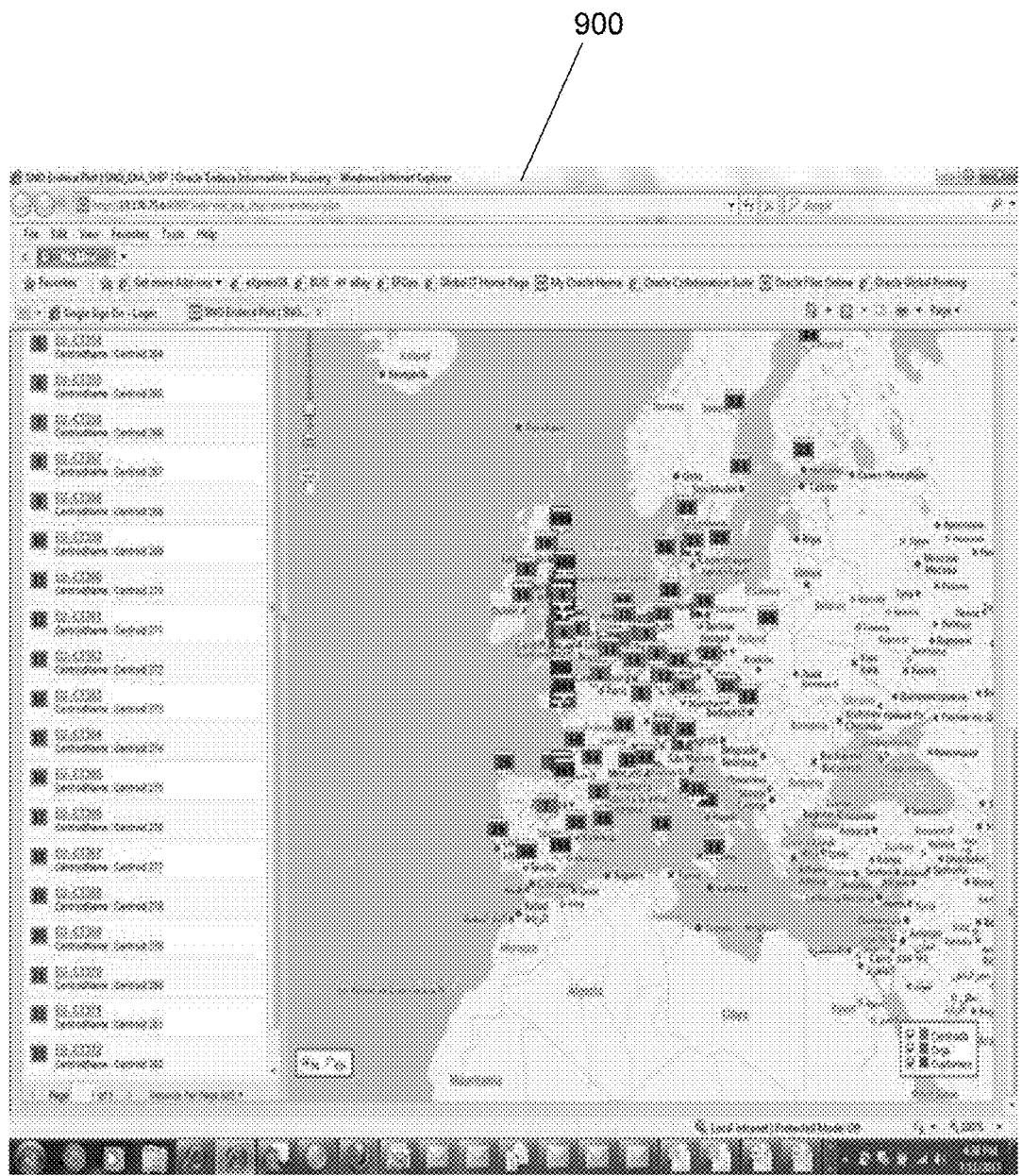
FIG. 9 illustrates an example user interface of a supply chain network strategic design system, according to an embodiment of the invention.

FIG. 9 illustrates an example user interface 900 of a supply chain network strategic design system, according to an embodiment of the invention. According to the illustrated embodiment, user interface 900 displays a representation of the European Union region. Further, user interface 900 displays a newly recommended configuration of 47 warehouses, where the 47 warehouses are positioned at various positions within the representation of the European Union region. According to the embodiment, the new configuration of 47 warehouses is in contrast to an original configuration of 59 warehouses, where the new configuration of warehouses maintains an identical level of a service level agreement as compared to the original configuration of warehouses.

Figure 10:
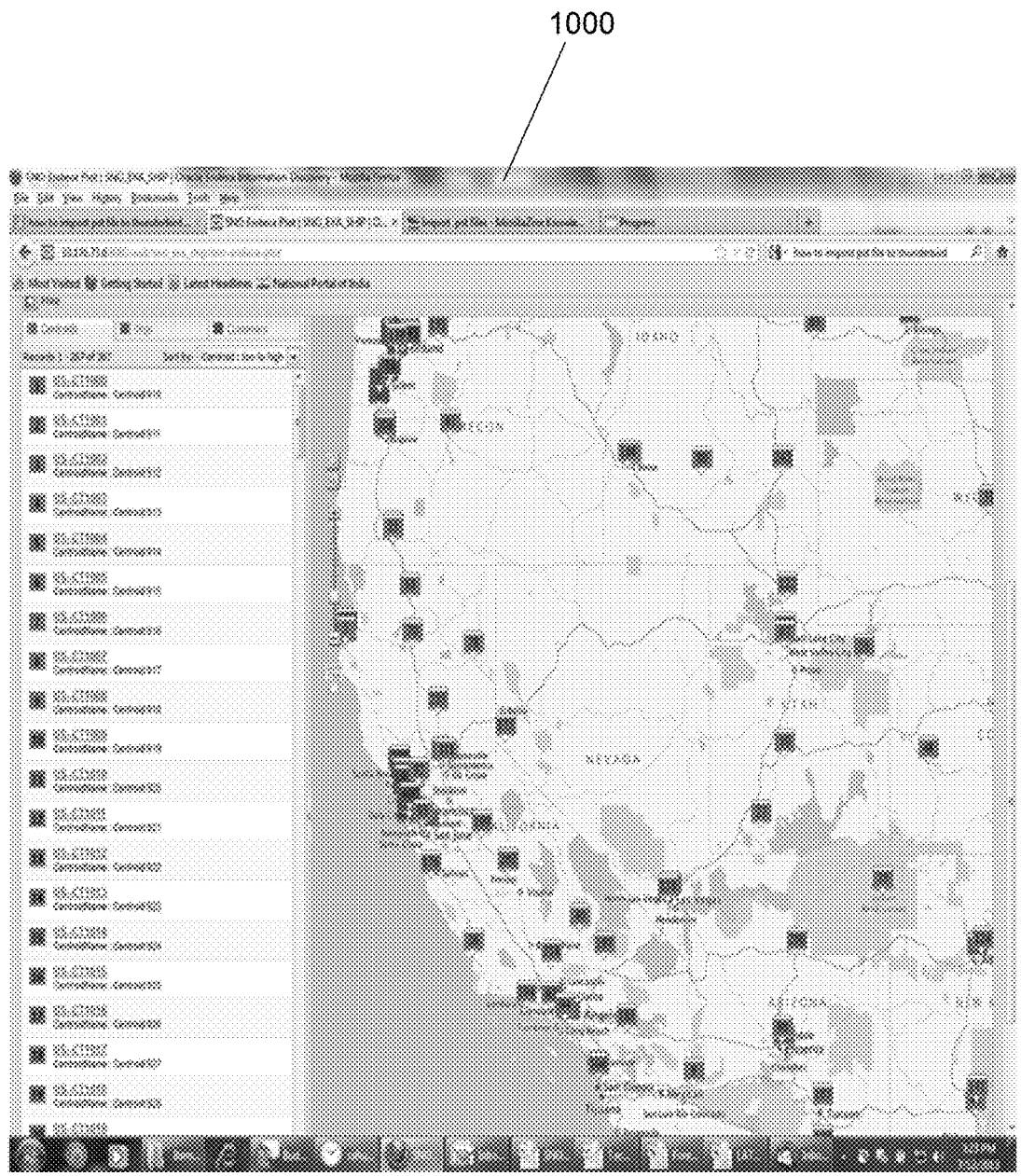
FIG. 10 illustrates another example user interface of a supply chain network strategic design system, according to an embodiment of the invention.

FIG. 10 illustrates another example user interface 1000 of a supply chain network strategic design system, according to an embodiment of the invention. According to the illustrated embodiment, user interface 1000 displays a representation of the North American region. Further, user interface 1000 displays a newly recommended configuration of 56 warehouses, where the 56 warehouses are positioned at various positions within the representation of the North American region. According to the embodiment, the new configuration of 56 warehouses is in contrast to an original configuration of 62 warehouses, where the new configuration of warehouses maintains an identical level of a service level agreement as compared to the original configuration of warehouses.

Figure 11:
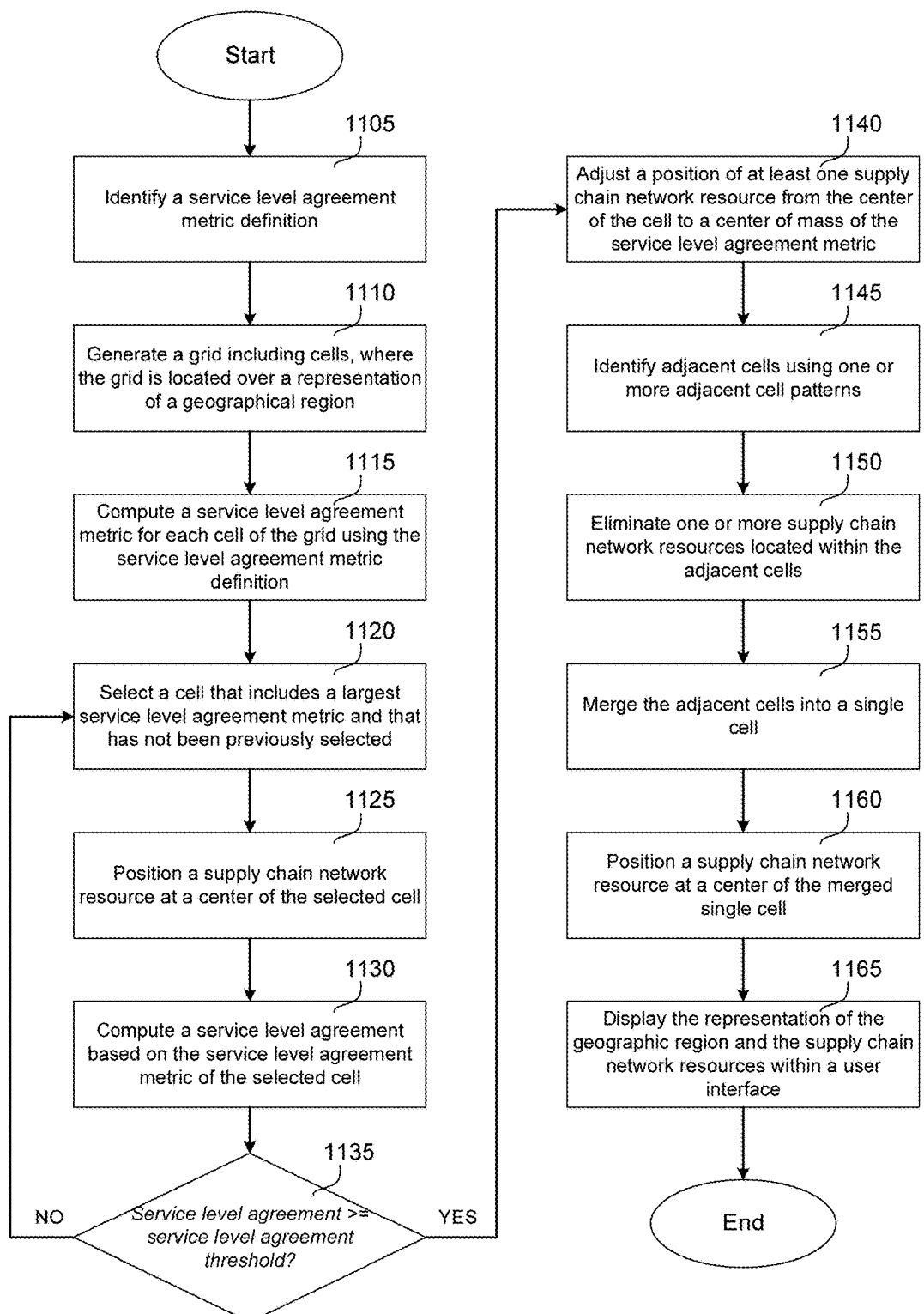
FIG. 11 illustrates a flow diagram of the functionality of a supply chain network strategic design module, according to an embodiment of the invention.

FIG. 11 illustrates a flow diagram of the functionality of a supply chain network strategic design module (such as supply chain network strategic design module 16 of FIG. 1), according to an embodiment of the invention. In one embodiment, the functionality of the flow diagram of FIG. 11 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 1105. At 1105, a service level agreement metric definition is identified for a supply chain network. In some embodiments, the identified service level agreement definition can define a service level agreement equal to a number of same-day shipments within a radius of all supply chain network resources divided by a total number of same-day shipments. In other embodiments, the identified service level agreement definition can define a service level agreement equal to a number of customers within a radius of all supply chain network resources divided by a total number of customers. Further, in other embodiments, the identified service level agreement definition can define a service level agreement equal to a total number of shipments within an x-mile radius of all warehouses (where x can be any number) divided by a total number of shipments. In yet other embodiments, the identified service level agreement definition can define a service level agreement equal to a total revenue of shipments within an x-mile radius of all warehouses (where x can be any number) divided by a total revenue of shipments. The flow then proceeds to 1110.

At 1110, a grid is generated, where the grid includes cells, and where the grid is located over a representation of a geographical region. In certain embodiments, the cells can be regular hexagonal cells. Further, in some embodiments, the geographic region can be one of: a country; a set of contiguous countries; or a specific region within a country. The flow then proceeds to 1115.

At 1115, a service level agreement metric is computed for each cell of the grid using the service level agreement metric definition. In certain embodiments, the service level agreement metric for each cell can be a number of customers within each cell. In other embodiments, the service level agreement metric for each cell can be a number of shipments within each cell. Further, in other embodiments, the service level agreement metric for each cell can be a revenue of shipments within each cell. In yet other embodiments, the service level agreement metric for each cell can be a number of same-day shipments within each cell. The flow then proceeds to 1120.

At 1120, a cell is selected, where the cell includes a largest service level agreement metric and where the cell has not been previously selected. In certain embodiments, the cells can be ordered in a decreasing order of a service level agreement metric. The flow then proceeds to 1125.

At 1125, a supply chain network resource is positioned at a center of the selected cell. In certain embodiments, the supply chain network resource can be a warehouse. In other embodiments, the supply chain network resource can be one of: a coffee shop, a grocery store, a restaurant, a pharmacy store, a hospital, an ATM, a gas station, a postal office, or a logistics office. The flow then proceeds to 1130.

At 1130, a service level agreement is computed based on the service level agreement metric of the selected cell. In certain embodiments, the service level agreement can be computed by computing a cumulative service level area metric that is a sum of the service level agreement metrics of the selected cells, and dividing the cumulative service level agreement metric by a total service level agreement metric for the geographic region. The flow then proceeds to 1135.

At 1135, it is determined whether the service level agreement is greater than or equal to a service level agreement threshold. If the service level agreement is greater than or equal to the service level agreement threshold, the flow proceeds to 1140. Otherwise, the flow returns to 1120.

At 1140, a position of at least one supply chain network resource is adjusted from the center of the cell to a center of mass of the service level agreement metric. In certain embodiments, the center of mass of the service level agreement metric can be a center of mass of one or more customer positions. The flow then proceeds to 1145.

At 1145, adjacent cells are identified using one or more adjacent cell patterns. The flow then proceeds to 1150.

At 1150, one or more supply chain network resources located within the adjacent cells are eliminated. The flow then proceeds to 1155.

At 1155, the adjacent cells are merged into a single cell. The flow then proceeds to 1160.

At 1160, a supply chain network resource is positioned at a center of the merged single cell. Thus, according to the embodiment, two or more supply chain network resources located within the adjacent cells can be replaced with a single supply chain network resource. The flow then proceeds to 1165.

At 1165, the representation of the geographical region and the supply chain network resources are displayed within a user interface. The flow then ends.

Thus, in one embodiment, a system can strategically design a supply chain network that includes a grid of cells, where an algorithm utilized by the system can determine positions of supply chain network resources within the cells based on a service level agreement metric definition. The system can provide a robust design solution that is minimally impacted by "noise" in the supply chain network data. The system can further provide business users an intuitive feel for why positions of supply chain network resources are optimal. Furthermore, the system can provide a seamless way to add or remove supply chain network resources until a desired service level agreement is met. However, one of the largest advantages of the algorithm utilized by the system is the simplicity of the algorithm, which can lead to a very low total cost of ownership to customers, performance, high usability, and out-of-the-box data integration. Thus, the system can provide a simple, robust, intuitive, and high-performance technique for designing a supply chain network. Further, the design (or re-design) of supply chain networks based on the algorithm utilized by the system can result in tangible and quantifiable business advantages for business users, as business users can maintain similar or identical service levels while saving significant overhead in operations costs.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to design a supply chain network, the designing comprising:
   identifying a service level agreement metric definition;
   generating a grid comprising a plurality of cells, wherein the grid is located over a representation of a geographical region;
   computing a service level agreement metric for each cell of the grid using the service level agreement metric definition;
   selecting a cell that includes a largest service level agreement metric and that has not been previously selected;
   positioning a supply chain network resource at an original position of the selected cell;
   computing a service level agreement based on the service level agreement metric of the selected cell;
   determining whether the service level agreement is greater than or equal to a service level agreement threshold; and
   repeating the selecting, positioning, computing, and determining until the service level agreement is greater than or equal to the service level agreement threshold.

2. The computer-readable medium of claim 1, the designing comprising:
   adjusting a position of at least one supply chain network resource from the original position of the cell to a position close to, or at, a center of mass of the service level agreement metric.

3. The computer-readable medium of claim 2, wherein the position close to, or at, the center of mass of the service level agreement metric comprises a position close to, or at, a center of mass of one or more customer positions.

4. The computer-readable medium of claim 2, the designing further comprising:
   replacing two or more supply chain network resources located within adjacent cells with a single supply chain network resource.

5. The computer-readable medium of claim 4, the replacing further comprising:
   identifying the adjacent cells using one or more adjacent cell patterns;
   eliminating one or more supply chain network resources located within the adjacent cells;
   merging the adjacent cells into a single cell; and
   positioning a supply chain network resource at a position close to, or at, a center of the merged single cell.

6. The computer-readable medium of claim 1, the designing further comprising:
   displaying the representation of the geographical region and the supply chain network resources within a user interface.

7. The computer-readable medium of claim 1, the computing the service level agreement further comprising:
   computing a cumulative service level area metric that is an aggregation of the service level agreement metrics of the selected cells; and
   dividing the cumulative service level agreement metric by a total service level agreement metric for the geographic region.

8. The computer-readable medium of claim 1, wherein the service level agreement definition comprises a number of customers, and wherein each service level agreement metric for each cell comprises a number of customers within each cell.

9. The computer-readable medium of claim 8, wherein the supply chain network resources comprise warehouses.

10. The computer-readable medium of claim 9, wherein the service level agreement comprises a number of customers within a pre-defined radius of at least one supply chain network resource divided by a total number of customers.

11. A computer-implemented method for designing a supply chain network, the computer-implemented method comprising:
    identifying a service level agreement metric definition;
    generating a grid comprising a plurality of cells, wherein the grid is located over a representation of a geographical region;
    computing a service level agreement metric for each cell of the grid using the service level agreement metric definition;
    selecting a cell that includes a largest service level agreement metric and that has not been previously selected;
    placing positioning a supply chain network resource within an original position of the selected cell;
    computing a service level agreement based on the service level agreement metric of the selected cell;
    determining whether the service level agreement is greater than or equal to a service level agreement threshold; and repeating the selecting, positioning, computing, and determining until the service level agreement is greater than or equal to the service level agreement threshold.

12. The computer-implemented method of claim 11, further comprising:
adjusting a position of at least one supply chain network resource from the original position of the cell to a position close to, or at, a center of mass of the service level agreement metric.

13. The computer-implemented method of claim 12, further comprising:
replacing two or more supply chain network resources located within adjacent cells with a single supply chain network resource.

14. The computer-implemented method of claim 11, further comprising:
displaying the representation of the geographical region and the supply chain network resources within a user interface.

15. The computer-implemented method of claim 11, the computing the service level agreement further comprising:
computing a cumulative service level area metric that is an aggregation of the service level agreement metrics of the selected cells; and
dividing the cumulative service level agreement metric by a total service level agreement metric for the geographic region.

16. A system for designing a supply chain network, comprising:
a processor executing instructions to implement a plurality of modules, the implemented modules comprising:
a definition identification module configured to identify a service level agreement metric definition;
a grid generation module configured to generate a grid comprising a plurality of cells, wherein the grid is located over a representation of a geographical region;
a metric computation module configured to compute a service level agreement metric for each cell of the grid using the service level agreement metric definition;
a cell selection module configured to select a cell that includes a largest service level agreement metric and that has not been previously selected;
a supply chain network resource positioning module configured to position a supply chain network resource within an original position of the selected cell;
a service level agreement computation module configured to compute a service level agreement based on the service level agreement metric of the selected cell; and
a service level agreement determination module configured to determine whether the service level agreement is greater than or equal to a service level agreement threshold;
wherein the cell selection module, supply chain network resource positioning module, service level agreement computation module, and service level agreement determination module are further configured to repeat selecting, positioning, computing, and determining, respectively, until the service level agreement is greater than or equal to the service level agreement threshold.

17. The system of claim 16, the implemented modules further comprising:
a supply chain network resource adjustment module configured to adjust a position of at least one supply chain network resource from the original position of the cell to a position close to, or at, a center of mass of the service level agreement metric.

18. The system of claim 17, the implemented modules further comprising:
a supply chain network resource replacement module configured to replace two or more supply chain network resources located within adjacent cells with a single supply chain network resource.

19. The system of claim 16, the implemented modules further comprising:
a display module configured to display the representation of the geographical region and the supply chain network resources within a user interface.

20. The system of claim 16,
wherein the metric computation module is further configured to compute a cumulative service level area metric that is an aggregation of the service level agreement metrics of the selected cells; and
wherein the metric computation module is further configured to divide the cumulative service level agreement metric by a total service level agreement metric for the geographic region.

21. The computer-readable medium of claim 1, wherein the original position of the selected cell comprises a center of the selected cell.

* * * * *

UNITED STATES PATENT AND TRADEMARK OFFICE
CERTIFICATE OF CORRECTION

PATENT NO. : 9,672,485 B2
APPLICATION NO. : 14/089890
DATED : June 6, 2017
INVENTOR(S) : Chaudhary et al.

It is certified that error appears in the above-identified patent and that said Letters Patent is hereby corrected as shown below:

In the Specification

Column 6, Line 37, delete "an an" and insert -- an --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*